Aug. 21, 1934.   R. H. ROSENBERG   1,971,018
METHOD OF MAKING AN ARTILLERY STEEL WHEEL
Filed Sept. 17, 1931
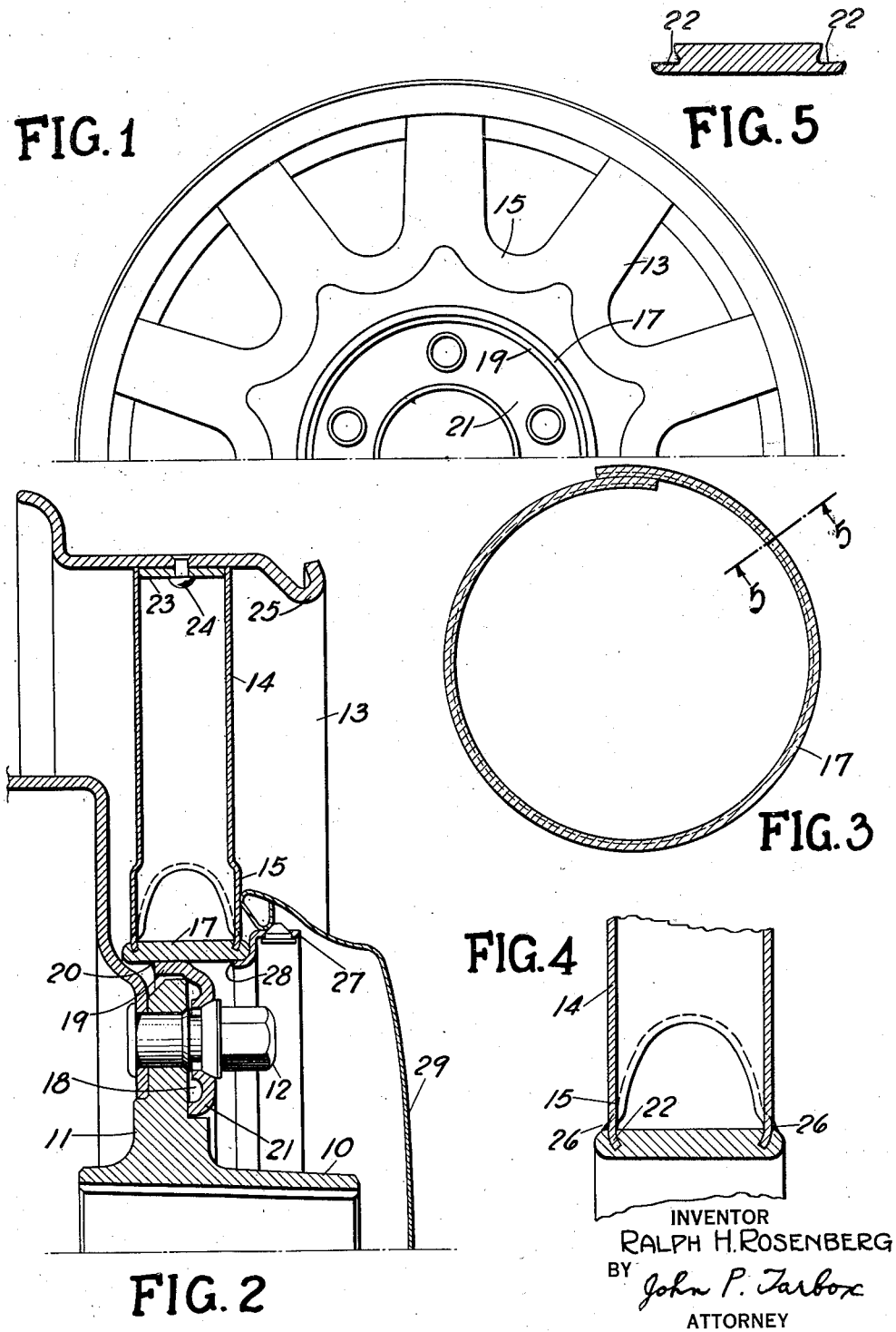
INVENTOR
RALPH H. ROSENBERG
BY John P. Tarbox
ATTORNEY Patented Aug. 21, 1934

1,971,018

UNITED STATES PATENT OFFICE 1,971,018

METHOD OF MAKING AN ARTILLERY STEEL WHEEL

Ralph H. Rosenberg, Detroit, Mich., assignor to Budd Wheel Company, Philadelphia, Pa., a corporation of Pennsylvania Application September 17, 1931, Serial No. 563,315

4 Claims. (Cl. 29—159.03)

My invention relates to the art of wheels and particularly to the art of metal wheels having hollow spoke and nave portions. It has been my object to improve both the structural characteristics of such wheels and the methods of manufacturing them. More specifically, I have sought to render such a wheel more rugged in its central nave portion and in its zones of attachment to the rim, and at the same time to design a superior wheel and a high speed method which would facilitate the manufacture thereof.

The manner in which I have attained these and other objects of my invention will be apparent from a reading the sub-joined specification in the light of the attached drawing, in which, Fig. 1 is a side elevation of the upper half of my improved wheel.

Fig. 2 is a transverse cross section of my wheel illustrating the attachment thereof to a vehicle rim and hub.

Fig. 3 is a longitudinal section through an annular closure plate forming a part of my improved wheel.

Fig. 4 is a detail transverse section illustrating the connection of this closure plate to the wheel body proper, and Fig. 5 is a section on the line 5—5 of Fig. 3.

I will first describe the details of construction of my wheel and then discuss the method whereby I propose to manufacture it. A conventional rear hub of the vehicle is indicated at 10. This hub is provided with a radially extending annular flange 11 through which the wheel body is secured by a series of studs and nuts 12 coacting with openings in a portion of the wheel to clamp it against the hub flange. The wheel body member is indicated at 13 and is of the artillery steel type having integral hollow spoke and nave portions designated at 14 and 15 respectively.

This wheel body is formed without a closure at the inner circumference of the nave portion, the inner edges of the opposite sides of the wheel body lying substantially in the planes of the sides of the wheel. In order to close the nave portion of the wheel an annular plate 17 of relatively heavy section is provided. This plate is provided with a pair of generally radially extending curved grooves 22 which extend entirely about the annulus. These curved grooves receive the inner extremities of the nave of the wheel body, this nave being preferably arc welded to the plate on opposite sides thereof as indicated at 26.

An annular ring 27 of Z-section is also arc welded to the closure plate 17 and adjacent its outer axial extremities serves as a mounting plate for a removable hub cap 29. The mounting plate 18 is secured to the interior of the closure plate 17 through an arc welded union 20 between the closure plate and an annular flange 19 on the mounting plate which telescopes within the inner circumference of the plate 17. This mounting plate is also provided with a radially extending portion 21 through which it is secured by the attaching studs 12 to the flange 11. The wheel body is secured to the rim member 25 by discs 23 which telescope within the ends of the spokes and are riveted thereto as indicated at 24.

In the manufacture of the wheel the main body portion is formed separately from all other parts of the wheel and assembled with the rim member and riveted thereto through the discs 23 and rivets 24 before any of the other parts of the wheel are secured to the main body portion. By securing the rim member to the wheel body member in this way before the nave portion is closed, the discs 23 may be inserted outwardly through the open nave of the wheel and riveted in position by manipulation through a tool inserted through this open nave. The use of an open nave portion which facilitates the application of a riveting or welding tool is regarded as a highly important feature of my invention.

After the securement of the main body of the wheel to the rim member, the closure plate 17 is applied to the open nave portion of the wheel. This portion is initially formed with cutaway portions at its opposite axial extremities as indicated at 22, and has its ends overlapping when first inserted within the wheel body as indicated in Fig. 3. It is then extended to a true circle and receives the inner radial portions of the wheel body within its cut-away portions 22. After the assembly of the parts in this manner the ends of the plate 17 are welded together and the inner radial extremities of the wheel body are curled over by a press operation to the shape indicated in Fig. 4. The cut-away axial extremities of the plate are then turned upwardly to the position of Fig. 4 and arc welded to the main body of the wheel, thus securing the parts in their assembled relationship. The mounting plate may thereafter be telescoped within the ring 17 and arc welded thereto at 20, and the hub cap securing ring likewise affixed to the closure plate at 28.

It will thus be seen that I have provided a wheel that is extremely rugged in both its nave and rim portions, and that I have also devised a method of assembling such a wheel which very considerably facilitates the manufacture thereof.

Modifications will be obvious to those skilled in the art and I do not therefore wish to be limited except by the scope of my sub-joined claims as interpreted in the light of the generic spirit of my invention.

What I claim is:—

1. The method of making an artillery metal wheel which comprises fabricating a main body portion consisting of integral hollow nave and spoke portions open at both radial extremities, securing said main body portion to a vehicle rim through the hollow spoke ends and thereafter expanding an annular grooved closure plate so that it receives the edge of the hollow nave portion of the wheel in its groove and surrounds the said edge and then securing said closure plate to the outer side of said edge.

2. The method of making an artillery metal wheel which comprises fabricating a main body portion consisting of integral hollow nave and spoke portions open at both radial extremities, securing said main body portion to a vehicle rim through the hollow spoke ends and thereafter expanding an annular grooved closure plate so that it receives the edge of the hollow nave portion of the wheel in its groove and surrounds the said edge and then securing said closure plate by arc welding to the outer side of said edge.

3. The method of making an artillery metal wheel which comprises fabricating a main body portion consisting of integral hollow nave and spoke portions open at both radial extremities, securing said main body portion to a vehicle rim through the hollow spoke ends and thereafter expanding an annular grooved closure plate so that it receives the edge of the hollow nave portion of the wheel in its groove and surrounds said edge and then securing said closure plate to the outer side of said edge and locking the closure plate in position by securing a flanged mounting plate against the outer side of said closure plate with the flanged portion of the mounting plate telescoped within the closure plate.

4. The method of making an artillery steel wheel which comprises forming a main body portion having a nave open at its inner circumference, expanding a split ring into contact with the inner circumference of said nave, securing the ends of the ring together and securing said ring to the nave portion of said wheel body.

RALPH H. ROSENBERG.